(12) United States Patent
Xiong et al.

(10) Patent No.: US 11,646,668 B2
(45) Date of Patent: May 9, 2023

(54) POWER CONVERTER

(71) Applicant: Delta Electronics, Inc., Taoyuan (TW)

(72) Inventors: Yahong Xiong, Taoyuan (TW); Yang Leng, Taoyuan (TW); Junguo Cui, Taoyuan (TW); Zhongwang Yang, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 85 days.

(21) Appl. No.: 17/483,586

(22) Filed: Sep. 23, 2021

(65) Prior Publication Data
US 2022/0131471 A1 Apr. 28, 2022

(30) Foreign Application Priority Data

Oct. 27, 2020 (CN) .......................... 202011163688.7

(51) Int. Cl.
*H02M 3/335* (2006.01)
*H02M 1/38* (2007.01)
*H02M 1/08* (2006.01)

(52) U.S. Cl.
CPC ......... *H02M 3/33573* (2021.05); *H02M 1/08* (2013.01); *H02M 1/38* (2013.01); *H02M 3/33592* (2013.01)

(58) Field of Classification Search
CPC ......... H02M 3/33573; H02M 3/33592; H02M 1/08; H02M 1/38
USPC ......................................................... 363/17
See application file for complete search history.

(56) References Cited

U.S. PATENT DOCUMENTS

| | | | | |
|---|---|---|---|---|
| 5,625,545 | A | * | 4/1997 | Hammond .............. H02M 7/49 363/71 |
| 6,049,471 | A | * | 4/2000 | Korcharz .......... H02M 3/33592 363/21.13 |
| 2022/0376613 | A1 | * | 11/2022 | Britton .................... H02M 1/44 |
| 2023/0025144 | A1 | * | 1/2023 | Mantov ............. H02M 3/33573 |

FOREIGN PATENT DOCUMENTS

| | | |
|---|---|---|
| CN | 102067428 B | 4/2014 |
| CN | 103138620 B | 8/2015 |
| CN | 105048787 A | 11/2015 |
| CN | 103516181 B | 1/2017 |

* cited by examiner

Primary Examiner — Yemane Mehari
(74) Attorney, Agent, or Firm — Kirton McConkie; Evan R. Witt

(57) ABSTRACT

A power converter includes N power conversion units. Each power conversion unit includes a main switching circuit, a transformer, a synchronous rectifier circuit, an input signal terminal and a signal processor. A primary winding of the transformer is connected with the main switching circuit. The synchronous rectifier circuit is connected with a secondary winding of the transformer. The input signal terminal receives a first PWM control signal. The signal processor generates first and second PWM driving signals to drive the main switching circuit according to the first PWM control signal, and a phase difference between the first and second PWM driving signals is (180±θ) degree. The signal processor generates third and fourth PWM driving signals to drive the synchronous rectifier circuit according to the first PWM control signal, and a phase difference between the third and fourth PWM driving signals is (180±θ) degree.

11 Claims, 6 Drawing Sheets

POWER CONVERTER

CROSS-REFERENCE TO RELATED APPLICATION

This application claims priority to China Patent Application No. 202011163688.7, filed on Oct. 27, 2020. The entire contents of the above-mentioned patent application are incorporated herein by reference for all purposes.

FIELD OF THE INVENTION

The present disclosure relates to a power converter, and more particularly to a power converter capable of reducing the number of signal lines and the wiring area on the system board thereof.

BACKGROUND OF THE INVENTION

A power converter is used for converting between different forms or voltages of electricity. Conventionally, there are two types of power converters.

The first-type conventional power converter usually includes a buck circuit. The buck circuit performs associated operations according to the PWM control signal from the controller. For example, a 12V input voltage is converted into a 1.8V output voltage, and the output voltage is provided to electronic components. However, when the first-type conventional power converter is applied to a circumstance requiring a higher input voltage (e.g., 48V or 54V), for example a data center, the duty cycle of the control signal for controlling the first-type power converter needs to be very small in order to convert the input voltage (e.g., 48V or 54V) into the 1.8V output voltage. In other words, the conversion efficiency of the first-type power converter is not satisfied.

For reducing the volume, the weight and the generated heat and increasing the power density of the power converter, the second-type conventional power converter is usually applied to the circumstance requiring the higher input voltage (e.g., 48V or 54V). The second-type conventional power converter is a single-stage converter with a transformer. By adjusting the turn ratio of the primary winding to the secondary winding of the transformer, the conversion efficiency is increased.

However, the second-type conventional power converter still has some drawbacks. For example, the primary side of the power converter includes a bridge circuit with many power switches, and the secondary side of the power converter also includes a synchronous rectifier circuit with many power switches. In other words, the second-type conventional power converter includes more power switches than the first-type conventional power converter. Consequently, the controller needs to provide more PWM control signals to the plurality of power switches of the second-type conventional power converter. In this way, the number of the signal lines on the system board of the power converter is large, and the wiring area on the system board is also large. Moreover, the controller needs to use more resource to process more PWM control signals.

Moreover, in case that the second-type conventional power converter is a multi-phase power converter with a plurality of single-phase circuits, the controller needs to have many signal terminals to output the PWM control signals for controlling the multi-phase power converter. Consequently, the above problems become more serious, and the size of the controller is too large. As known, the dead time between associated PWM control signals from the controller should be precisely set to avoid the synchronous conduction of the upper switches and the lower switches of the bridge circuit in the primary side of the power converter or avoid the short-circuited condition of the primary/secondary sides of the power converter. Consequently, the controller needs to output more PWM control signals, and the method of designing the controller is more complicated.

Therefore, there is a need of providing an improved power converter in order to overcome the drawbacks of the conventional technologies.

SUMMARY OF THE INVENTION

The present disclosure provides a power converter. Due to the special design of the circuitry structure of the power converter, the number of the control signals to be outputted from the controller is reduced. In this way, the number of signal lines on the system board of the power converter is reduced, and the wiring area on the system board is reduced.

The present disclosure provides a power converter. Due to the special design of the circuitry structure of the power converter, it is not necessary to increase the size of the controller and the method of designing the controller is simplified.

In accordance with an aspect of present disclosure, a power converter including N power conversion units is provided, wherein N is an integer greater than or equal to 1. Each power conversion unit includes a main switching circuit, a transformer, a synchronous rectifier circuit, an input signal terminal and a signal processor. The main switching circuit includes a bridge circuit. A primary winding of the transformer is electrically connected with the main switching circuit. The synchronous rectifier circuit is electrically connected with a secondary winding of the transformer. The synchronous rectifier circuit includes at least two synchronous rectifier switches. The input signal terminal receives a first PWM control signal. The signal processor generates a first PWM driving signal and a second PWM driving signal to drive the bridge circuit according to the first PWM control signal, and a phase difference between the first PWM driving signal and the second PWM driving signal is $(180\pm\theta)$ degree. The signal processor generates a third PWM driving signal and a fourth PWM driving signal to drive the at least two synchronous rectifier switches according to the first PWM control signal, and a phase difference between the third PWM driving signal and the fourth PWM driving signal is $(180\pm\theta)$ degree. When N is greater than 1, the N power conversion units are connected with each other in parallel, and a difference between every two adjacent ones of the N first PWM control signals is $(360/N\pm\theta)$ degree, wherein $\theta$ is greater than or equal to 0 degree and less than 30 degree.

The above contents of the present disclosure will become more readily apparent to those ordinarily skilled in the art after reviewing the following detailed description and accompanying drawings, in which:

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1:
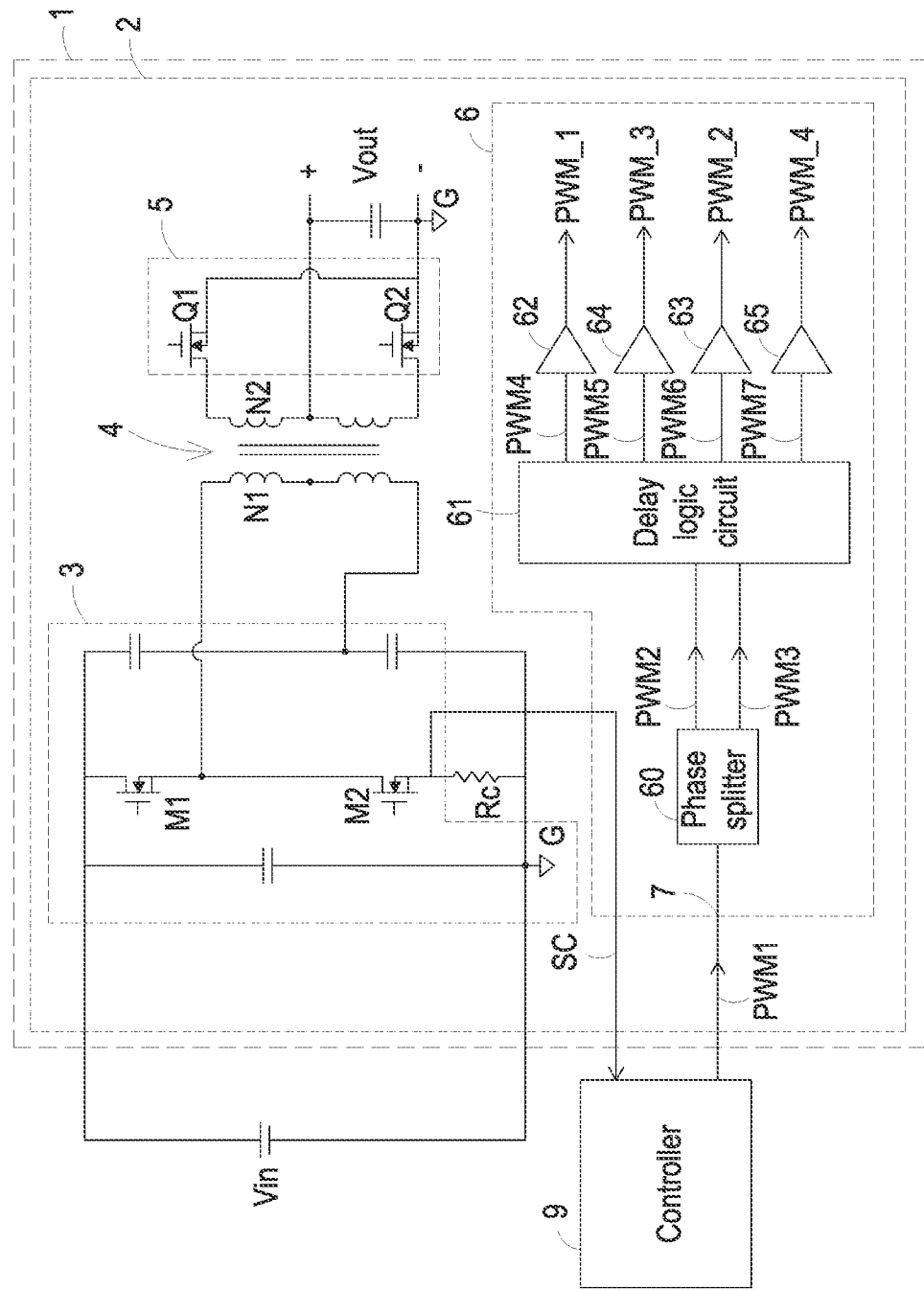
FIG. 1 is a schematic circuit diagram illustrating the circuitry structure of a power converter according to a first embodiment of the present disclosure.
Figure 2:
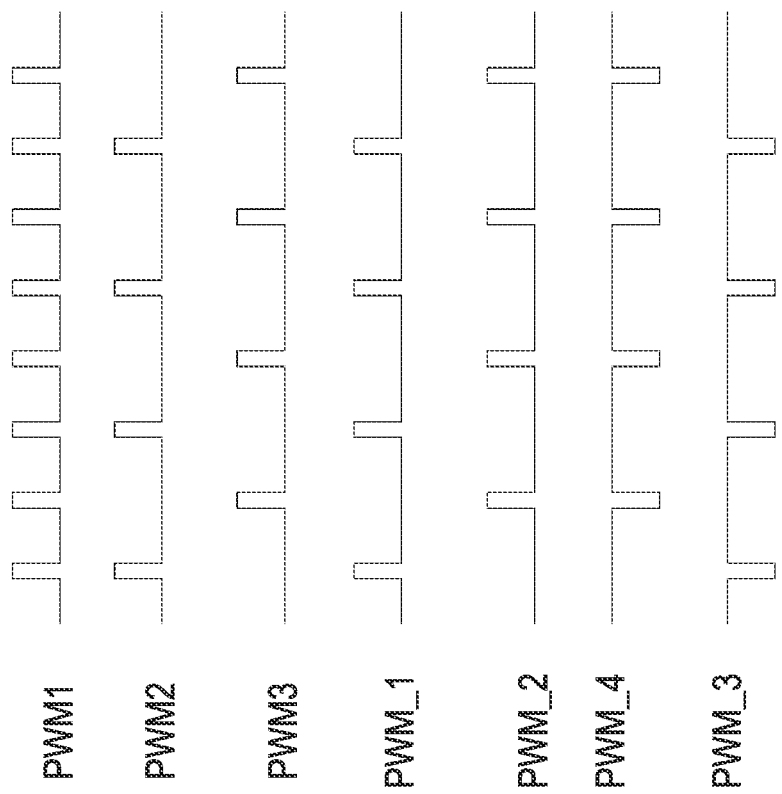
FIG. 2 is schematic timing waveform diagram illustrating associated control signals and driving signals for the power converter as shown in FIG. 1.

Please refer to FIGS. 1 and 2. FIG. 1 is a schematic circuit diagram illustrating the circuitry structure of a power converter according to a first embodiment of the present disclosure. FIG. 2 is schematic timing waveform diagram illustrating associated control signals and driving signals for the power converter as shown in FIG. 1. The power converter 1 can be applied to a power supply unit (not shown) and disposed on a system board (not shown) of the power supply unit. The power converter 1 receives an input voltage Vin and converts the input voltage Vin into an output voltage Vout. The output voltage Vout is provided to the electronic components of the power supply unit for powering the electronic components of the power supply unit. For example, the input voltage Vin is a 54V or 48V DC voltage, and the output voltage Vout is a 1.8V DC voltage, but not limited thereto.

The power converter 1 includes N power conversion units 2, wherein N is an integer greater than or equal to 1. In the embodiment of FIG. 1, N is equal to 1. That is, the power converter 1 includes one power conversion unit 2, and the power converter 1 is a single-phase power converter. As shown in FIG. 1, the power conversion unit 2 includes a main switching circuit 3, a transformer 4, a synchronous rectifier circuit 5, a signal processor 6 and an input signal terminal 7.

The main switching circuit 3 receives the input voltage Vin. The main switching circuit 3 includes a bridge circuit. The bridge circuit is a half-bridge circuit or a full-bridge circuit. In the embodiment of FIG. 1, the bridge circuit is a half-bridge circuit including two main switches M1 and M2 connected in series. The two main switches M1 and M2 are connected with each other and collaboratively formed as a bridge arm. By alternately turning on and turning off the two main switch elements M1 and M2, the input voltage Vin is converted into a first transition AC voltage by the main switching circuit 3.

The transformer 4 includes a primary winding N1 and a secondary winding N2. The primary winding N1 is electrically connected with the main switching circuit 3 to receive the first transition AC voltage. Due to the electromagnetic coupling effect between the primary winding N1 and the secondary winding N2, the secondary winding N2 generates a second transition AC voltage. Preferably but not exclusively, the secondary winding N2 has a center-tap structure.

The synchronous rectifier circuit 5 is electrically connected with the secondary winding N2 of the transformer 4. The synchronous rectifier circuit 5 includes at least two synchronous rectifier switches Q1 and Q2. By alternately turning on and turning off the two synchronous rectifier switches Q1 and Q2, the second transition AC voltage is converted into the output voltage Vout by the synchronous rectifier circuit 5.

The input signal terminal 7 is electrically connected with a controller 9 of the power supply unit. The input signal terminal 7 receives a first pulse width modulation (PWM) control signal PWM1 from the controller 9.

The signal processor 6 generates a first PWM driving signal PWM_1 and a second PWM driving signal PWM_2 according to the first PWM control signal PWM1. The phase difference between the first PWM driving signal PWM_1 and the second PWM driving signal PWM_2 is (180±θ) degree. Consequently, the main switch M1 is driven by the first PWM driving signal PWM_1, and the main switch M2 is driven by the second PWM driving signal PWM_2. Similarly, the signal processor 6 generates a third PWM driving signal PWM_3 and a fourth PWM driving signal PWM_4 according to the first PWM control signal PWM1. The phase difference between the third PWM driving signal PWM_3 and the fourth PWM driving signal PWM_4 is (180±θ) degree. Consequently, the synchronous rectifier switch Q2 is driven by the third PWM driving signal PWM_3, and the synchronous rectifier switch Q1 is driven by the fourth PWM driving signal PWM_4. Preferably but not exclusively, the angle θ is greater than or equal to 0 degree and less than 30 degrees. However, the angle θ is not limited to the above embodiment and may be varied according to the practical requirements.

As previously described, in case that the second-type conventional power converter is a single-phase circuit, the controller needs to output at least two PWM control signals to control the switches in the main switching circuit and the switches in the synchronous rectifier circuit. In comparison with the second-type conventional power converter, the power converter 1 of the present disclosure is equipped with the signal processor 6. Consequently, the following benefits can be achieved. In case that the power converter 1 of the present disclosure includes a power conversion unit 2 being a single-phase circuit, the controller 9 needs to output the single first PWM control signal PWM1 only. After the first PWM control signal PWM1 is processed into the PWM driving signals PWM_1, PWM_2, PWM_3 and PWM_4 by the signal processor 6 of the power conversion unit 2, the PWM driving signals PWM_1, PWM_2, PWM_3 and PWM_4 are provided to the two main switches M1 and M2 and the two synchronous rectifier switches Q2 and Q1, respectively. In this way, the number of the signal lines on the system board of the power converter 1 is reduced, and the wiring area on the system board is reduced. Moreover, the resources of the controller 9 for outputting PWM control signals are also reduced.

In some embodiments, the main switching circuit 3 and the synchronous rectifier circuit 5 are electrically connected with a ground terminal G. The signal processor 6 further includes a phase splitter 60. The phase splitter 60 is used to perform a phase-splitting operation on the first PWM control signal PWM1, and thus a second PWM control signal PWM2 and a third PWM control signal PMW3 are generated. There is a predetermined phase difference between the second PWM control signal PWM2 and the third PWM control signal PMW3. The frequency of the first PWM control signal PWM1 is twice the frequency of the second PWM control signal PWM2. In addition, the frequency of the first PWM control signal PWM1 is twice the frequency of the third PWM control signal PWM3. For example, the predetermined phase difference between the second PWM control signal PWM2 and the third PWM control signal PWM3 is (180±θ) degree.

Moreover, the signal processor 6 includes a logic delay circuit 61. The logic delay circuit 61 delays the second PWM control signal PWM2 for two different time intervals, respectively. Consequently, a fourth PWM control signal PWM4 and a fifth PWM control signal PWM5 are generated, wherein there is a dead time between the fourth PWM control signal PWM4 and the fifth PWM control signal PWM5. The logic delay circuit 61 also delays the third PWM control signal PWM3 for two different time intervals, respectively. Consequently, a sixth PWM control signal PWM6 and a seventh PWM control signal PWM7 are generated, wherein there is a dead time between the sixth PWM control signal PWM6 and the seventh PWM control signal PWM7.

Figure 3:
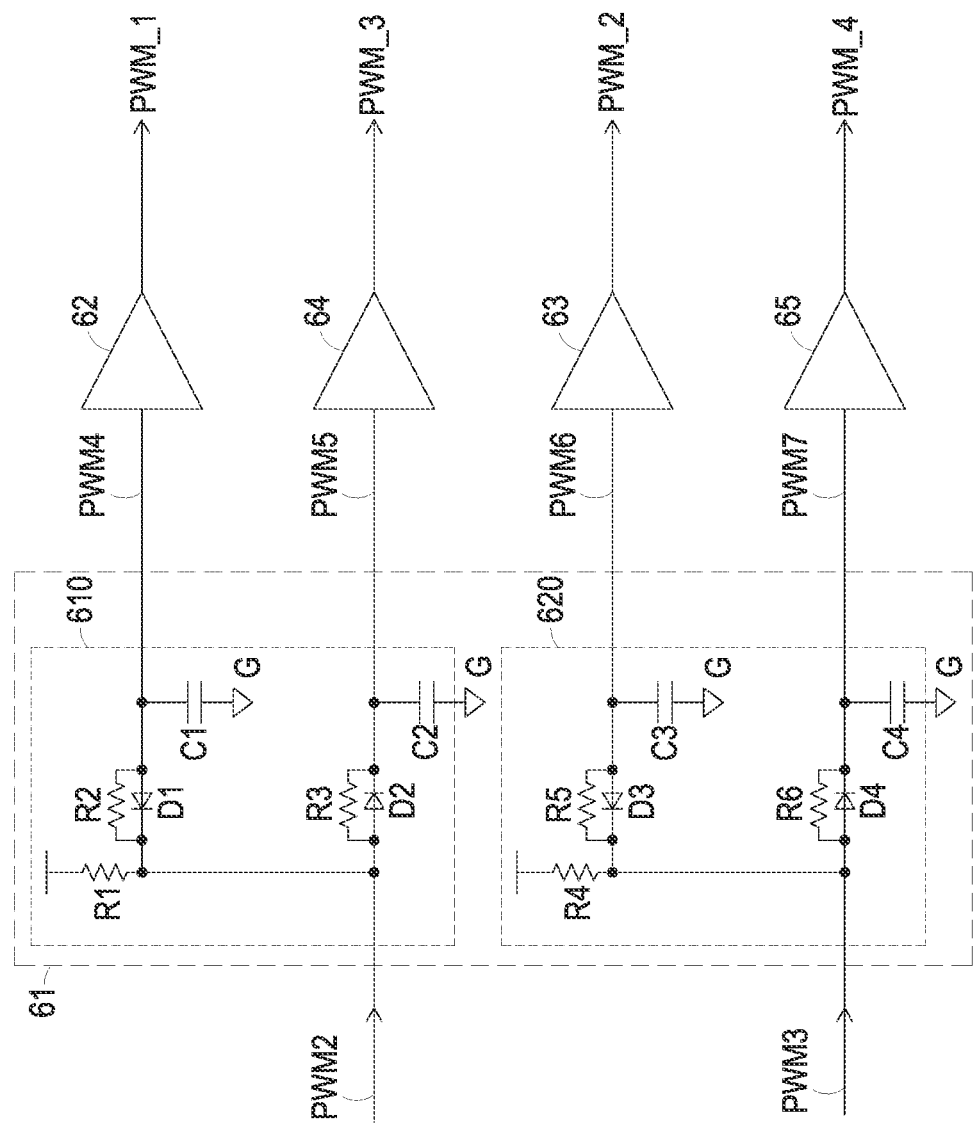
FIG. 3 is a schematic circuit diagram illustrating the detailed circuitry structure of the delay logic circuit of the power converter as shown in FIG. 1.

FIG. 3 is a schematic circuit diagram illustrating the detailed circuitry structure of the logic delay circuit of the power converter as shown in FIG. 1. As shown in FIG. 3, the logic delay circuit 61 includes a first delay circuit 610 and a second delay circuit 620.

The first delay circuit 610 includes a first resistor R1, a second resistor R2, a third resistor R3, a first diode D1, a second diode D2, a first capacitor C1 and a second capacitor C2. The first terminal of the first resistor R1 is connected with a voltage source. The first terminal of the second resistor R2, the first terminal of the third resistor R3, the cathode of the first diode D1, the anode of the second diode D2 and the second terminal of the first resistor R1 are electrically connected with the phase splitter 60 to receive the second PWM control signal PWM2 from the phase splitter 60. The first terminal of the first capacitor C1 is electrically connected with the second terminal of the second resistor R2 and the anode of first diode D1. The second terminal of the first capacitor C1 is electrically connected with the ground terminal G. The first terminal of the second capacitor C2 is electrically connected with the second terminal of the third resistor R3 and the cathode of the second diode D2. The second terminal of the second capacitor C2 is electrically connected with the ground terminal G.

The second delay circuit 620 includes a fourth resistor R4, a fifth resistor R5, a sixth resistor R6, a third diode D3, a fourth diode D4, a third capacitor C3 and a fourth capacitor C4. The first terminal of the fourth resistor R4 is electrically connected with the voltage source. The first terminal of the fifth resistor R5, the first terminal of the sixth resistor R6, the cathode of the third diode D3, the anode of the fourth diode D4 and the second terminal of the fourth resistor R4 are electrically connected with the phase splitter 60 to receive the third PWM control signal PWM3 from the phase splitter 60. The first terminal of the third capacitor C3 is electrically connected with the second terminal of the fifth resistor R5 and the anode of the third diode D3. The second terminal of the third capacitor C3 is electrically connected with the ground terminal G. The first terminal of the fourth capacitor C4 is electrically connected with the second terminal of the sixth resistor R6 and the cathode of the fourth diode D4. The second terminal of the fourth capacitor C4 is electrically connected with the ground terminal G.

As mentioned above, the first delay circuit 610 delays the second PWM control signal PWM2 for different time intervals to generate the fourth PWM control signal PWM4 and the fifth PWM control signal PWM5. There is a dead time between the PWM signals PWM4 and PWM5. The second delay circuit 620 delays the third PWM control signal PWM3 for different time intervals to generate the sixth PWM control signal PWM6 and the seventh PWM control signal PWM7. There is a dead time between the PWM signals PWM6 and PWM7. The circuitry structures of the first delay circuit 610 and the second delay circuit 620 are not restricted to the embodiment of FIG. 3. That is, the circuitry structures of the first delay circuit 610 and the second delay circuit 620 may be varied and selected as long as the first delay circuit 610 is capable of delaying the second PWM control signal PWM2 for different time intervals to generate the fourth PWM control signal PWM4 and the fifth PWM control signal PWM5 with a dead time therebetween and the second delay circuit 620 is capable of delaying the third PWM control signal PWM3 for different time intervals to generate the sixth PWM control signal PWM6 and the seventh PWM control signal PWM7 with a dead time therebetween.

Please refer to FIGS. 1, 2 and 3 again. In some embodiments, the signal processor 6 further includes two first drivers 62 and 63. The two first drivers 62 and 63 are electrically connected with the logic delay circuit 61. The first driver 62 receives the fourth PWM control signal PWM4 from the first delay circuit 610 of the logic delay circuit 61. The first driver 63 receives the sixth PWM control signal PWM6 from the second delay circuit 620 of the logic delay circuit 61. The first driver 62 can amplify the power of the fourth PWM control signal PWM4 and enhance its driving capability. Consequently, the first PWM driving signal PWM_1 is generated. The first driver 63 can amplify the power of the sixth PWM control signal PWM6 and enhance its driving capability. Consequently, the second PWM driving signal PWM_2 is generated.

The signal processor 6 further includes two second drivers 64 and 65. The two second drivers 64 and 65 are electrically connected with the logic delay circuit 61. The second driver 64 receives the fifth PWM control signal PWM5 from the first delay circuit 610 of the logic delay circuit 61. The second driver 65 receives the seventh PWM control signal PWM7 from the second delay circuit 620 of the logic delay circuit 61. The second driver 64 can amplify the power of the fifth PWM control signal PWM5 and enhance its driving capability. In addition, the second driver 64 performs an inverting operation on the fifth PWM control signal PWM5, so that the third PWM driving signal PWM_3 is generated. The second driver 65 can amplify the power of the seventh PWM control signal PWM7 and enhance its driving capability. In addition, the second driver 65 performs an inverting operation on the seventh PWM control signal PWM7, so that the fourth PWM driving signal PWM_4 is generated.

As shown in FIG. 2, there is a time delay between the first PWM driving signal PWM_1 (or the third PWM driving signal PWM_3) and the second PWM control signal PWM2, and there is a time delay between the second PWM driving signal PWM_2 (or the fourth PWM driving signal PWM_4) and the third PWM control signal PWM3. Since the time delay is very short with respect to the whole cycle, the time delay is not shown in FIG. 2.

In an embodiment, as shown in FIG. 2, the first PWM driving signal PWM_1 and the third PWM driving signal PWM_3 are complementary, and the second PWM driving signal PWM_2 and the fourth PWM driving signal PWM_4 are complementary. In addition, when the first PWM driving signal PWM1 is not transmitted into the input signal terminal 7, voltages provided by the first PWM driving signal PWM_1, the second PWM driving signal PWM_2, the third PWM driving signal PWM_3 and the fourth PWM driving signal PWM_4 are off-state voltages.

In an embodiment, the synchronous rectifier circuit 5 is a current doubler circuit or a center-tap circuit. The operating principles of driving and controlling the current doubler circuit and the center-tap circuit according to the driving control method of the third PWM driving signal PWM_3 and the fourth PWM driving signal PWM_4 are identical.

Please refer to FIG. 1 again. In some embodiments, the power conversion unit 2 further includes a current detection element (e.g., a current detection resistor Rc as shown in FIG. 1). In some other embodiments, the current detection element is a current sensor. The current detection resistor Rc is connected with the bridge arm of the bridge circuit of the main switching circuit 3. By detecting the current flowing through the bridge arm of the bridge circuit of the main switching circuit 3, the current detection resistor Rc generates a current detection signal SC corresponding to the current amplitude of the power conversion unit 2. The current detection signal SC can be further subjected to a signal processing operation (e.g., a filtering operation) by an independent processing circuit (not shown) or a processing circuit (not shown) of the controller 9. According to the processed current detection signal SC, the controller 9 performs a corresponding control operation on each power conversion circuit 2. For example, the control operation includes a current sharing control operation or an overcurrent protection control operation. Moreover, the controller 9 can sample the output voltage Vout from the power converter 1. The duty cycle or the width of the first PWM control signal PWM1 are adjusted according to the output voltage Vout and the current detection signal SC collaboratively.

In some embodiments, the power converter includes N power conversion units, wherein N is equal to or greater than 2. Consequently, the power converter is a multi-phase circuit.

Figure 4:
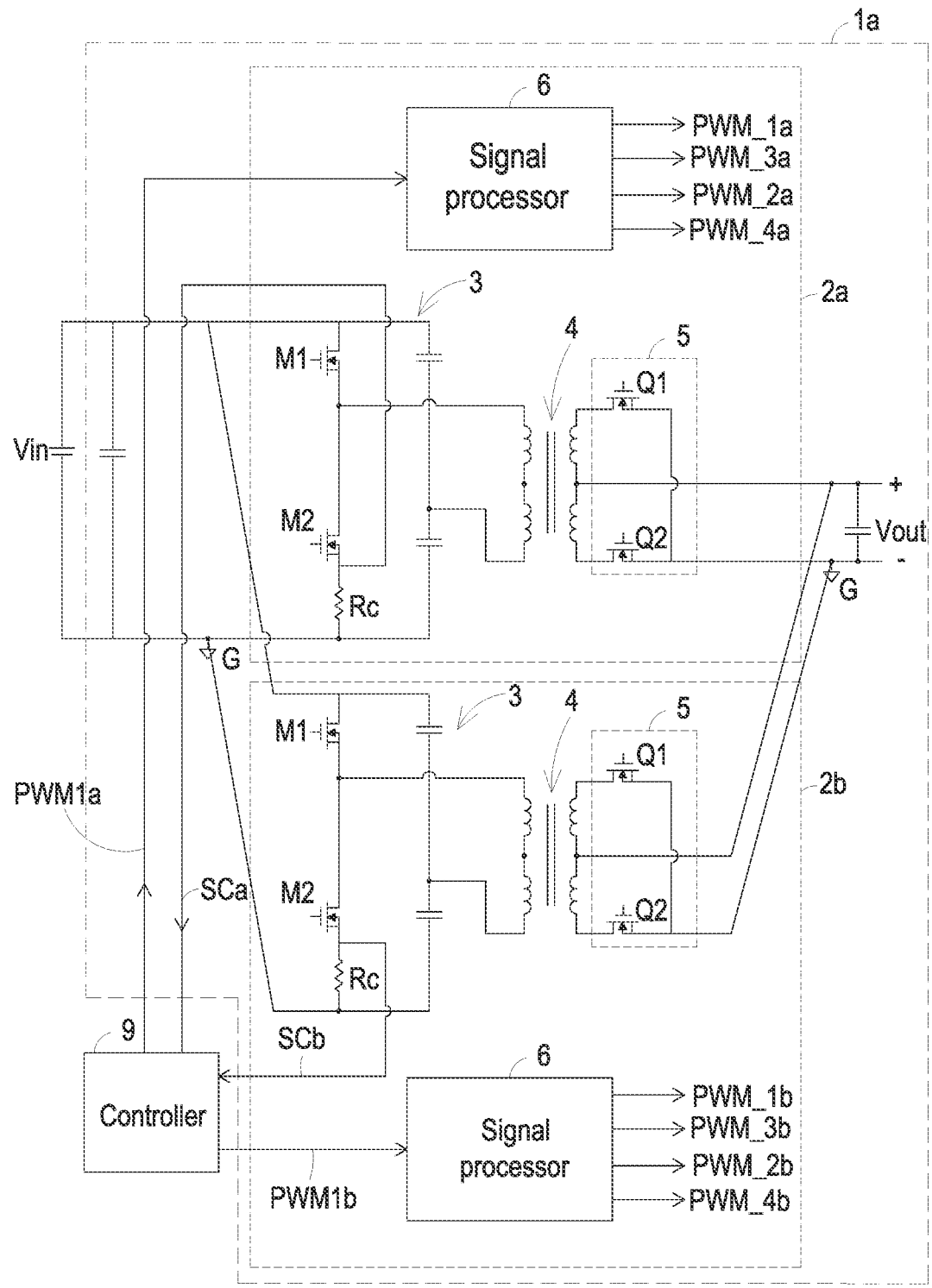
FIG. 4 is a schematic circuit diagram illustrating the circuitry structure of a power converter according to a second embodiment of the present disclosure.
Figure 5:
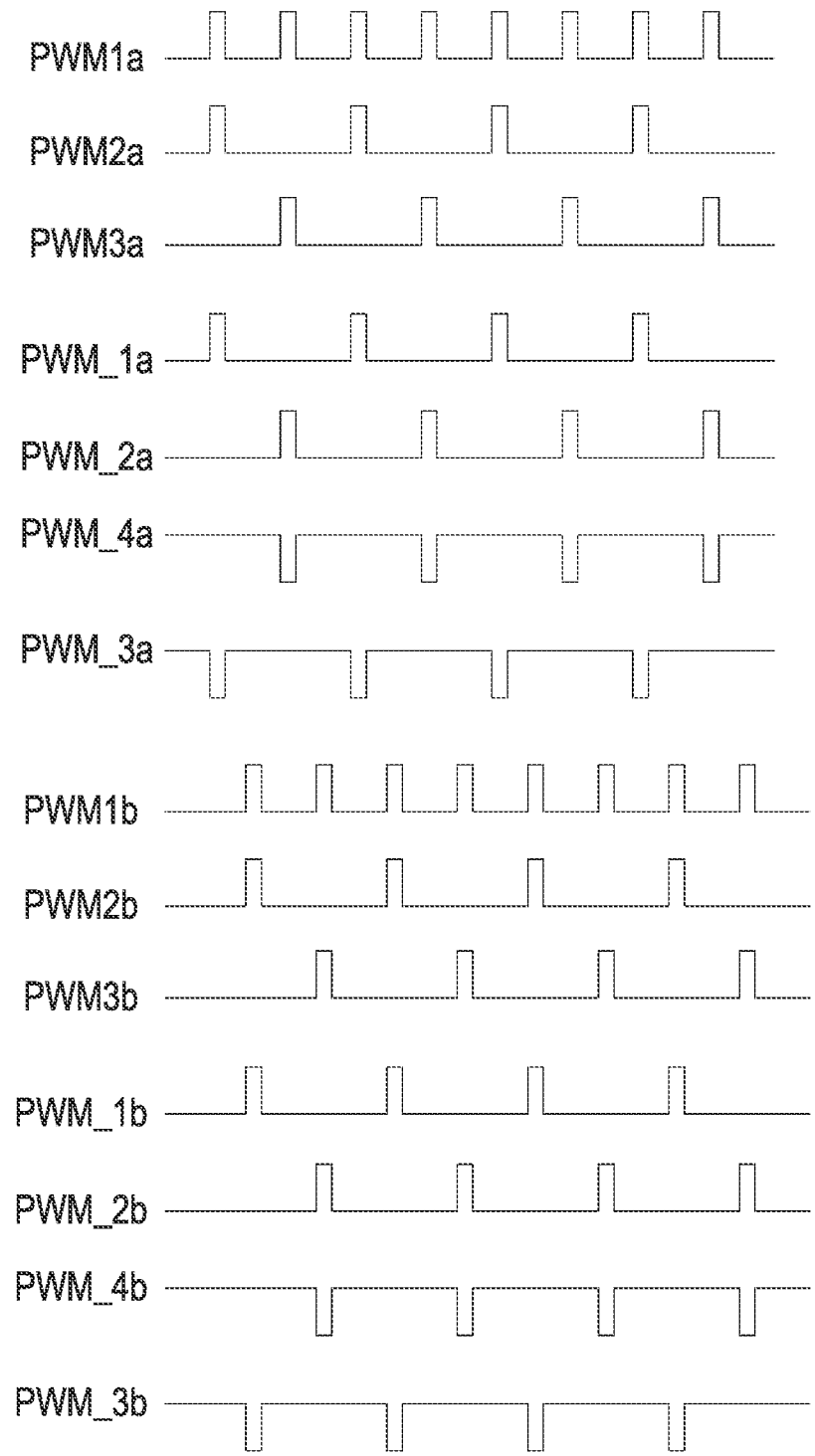
FIG. 5 is schematic timing waveform diagram illustrating associated control signals of the power converter as shown in FIG. 4.

Please refer to FIGS. 4 and 5. FIG. 4 is a schematic circuit diagram illustrating the circuitry structure of a power converter according to a second embodiment of the present disclosure. FIG. 5 is schematic timing waveform diagram illustrating associated control signals of the power converter as shown in FIG. 4. As shown in FIG. 4, the power converter 1*a* includes two power conversion units 2*a* and 2*b*. The concepts of this embodiment can be applied to the power converter with three or more than three power converters. The circuitry structures and the operations of the power conversion units 2*a* and 2*b* in the second embodiment as shown in FIG. 4 are similar to those of the power conversion unit 2 in the first embodiment as shown in FIG. 1. Component parts and elements corresponding to those of the first embodiment are designated by identical numeral references, and detailed descriptions thereof are omitted.

As shown in FIG. 4, the power conversion units 2*a* and 2*b* are connected with each other in parallel, and there is a phase difference between associated signals of the power conversion units 2*a* and 2*b*. In FIG. 5, the first PWM control signal, the second PWM control signal, the third PWM control signal, the first PWM driving signal, the second PWM driving signal, the third PWM driving signal and the fourth PWM driving signal related to the power conversion unit 2*a* are respectively indicated as PWM1*a*, PWM2*a*, PWM3*a*, PWM_1*a*, PWM_2*a*, PWM_3*a* and PWM_4*a*. The first PWM control signal, the second PWM control signal, the third PWM control signal, the first PWM driving signal, the second PWM driving signal, the third PWM driving signal and the fourth PWM driving signal related to the power conversion unit 2*b* are respectively indicated as PWM1*b*, PWM2*b*, PWM3*b*, PWM_1*b*, PWM_2*b*, PWM_3*b* and PWM_4*b*.

The input terminals of the power conversion units 2*a* and 2*b* are electrically connected with each other in parallel to receive the input voltage Vin. The output terminals of the power conversion units 2*a* and 2*b* are electrically connected with each other in parallel to output the output voltage Vout. In case that the power converter 1*a* is an N-phase circuit comprising N parallel-connected power conversion units, the controller 9 correspondingly generates N first PWM control signals PWM1. The number of the first PWM control signals PWM1 is the same as the number of the power conversion units 2. Moreover, the phase difference between every two adjacent ones of the N first PWM control signals PWM1 is equal to (360/N±θ) degree. For example, in the embodiment of FIG. 4, N is equal to 2. Consequently, the controller 9 generates two first PWM control signals PWM1, i.e., PWM1*a* and PWM1*b*. The phase difference between the two first PWM control signals PWM1*a* and PWM1*b* are equal to (360/2±θ) degree.

As shown in FIG. 5, there is a time delay between the first PWM driving signal PWM_1*a* (or the third PWM driving signal PWM_3*a*) and the second PWM control signal PWM2*a*. Similarly, there is a time delay between the second PWM driving signal PWM_2*a* (or the fourth PWM driving signal PWM_4*a*) and the third PWM control signal PWM3*a*. Similarly, there is a time delay between the first PWM driving signal PWM_1*b* (or the third PWM driving signal PWM_3*b*) and the second PWM control signal PWM2*b*. Similarly, there is a time delay between the second PWM driving signal PWM_2*b* (or the fourth PWM driving signal PWM_4*b*) and the third PWM control signal PWM3*b*. Since the time delay is very short with respect to the whole cycle, the time delay is not shown in FIG. 5.

In case that the second-type conventional power converter is a multi-phase circuit (e.g., a six-phase circuit), the controller needs to output 4 PWM control signals to control the switches of each phase circuit. That is, the controller needs to generate a total of 24 PWM control signals to control the switches of the power converter. Consequently, the size of the controller is too large, the wiring pattern of the system board is complicated, and the circuitry structure of the controller is complicated. Whereas, in case that the power converter of the present disclosure is a six-phase circuit, the controller needs to generate a total of 6 PWM control signals only. Consequently, the occupied resource of the controller is largely reduced, the wiring pattern of the system board is simplified, and the size of the controller is reduced.

Figure 6:
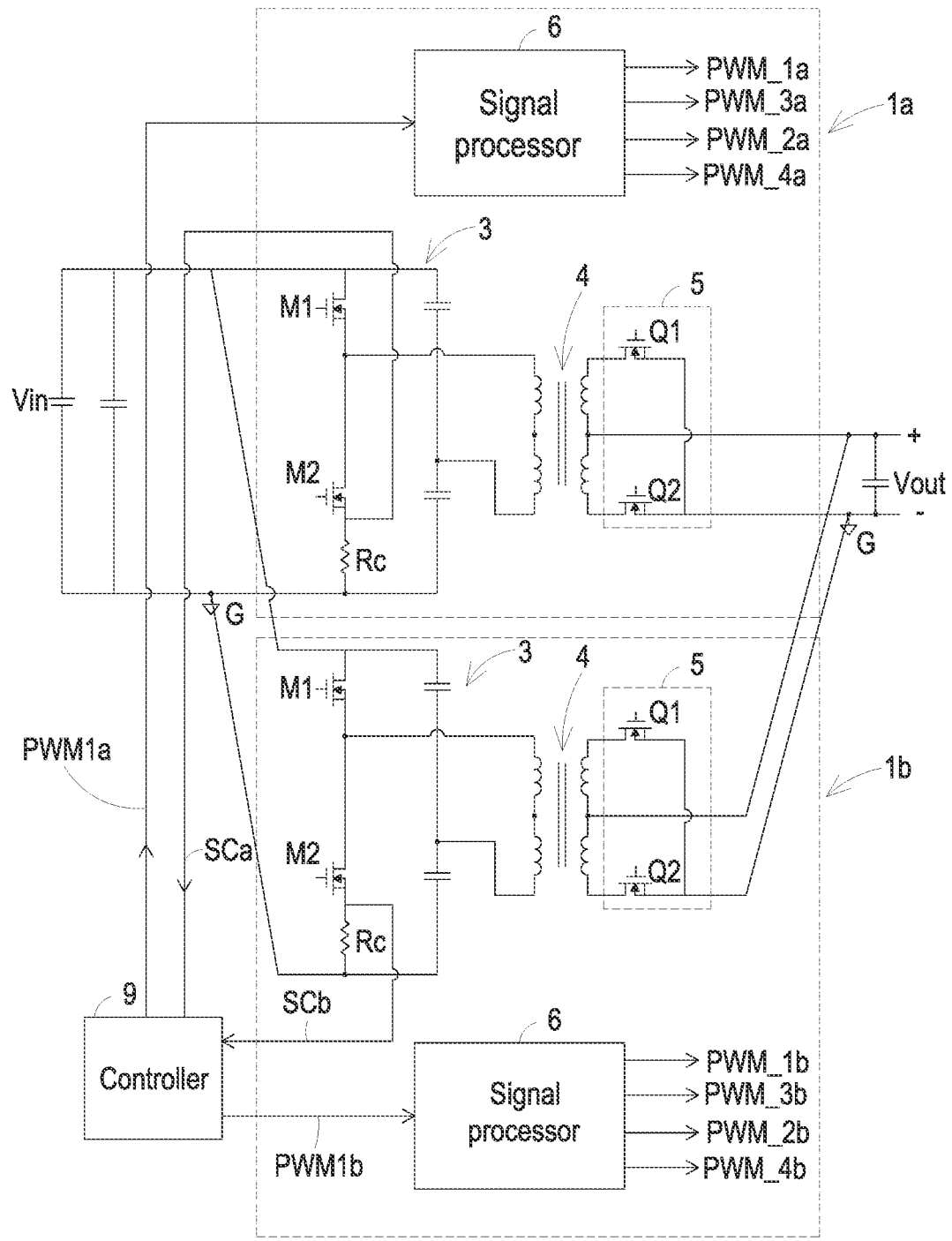
FIG. 6 is a schematic circuit diagram illustrating an integrated circuitry structure of plural power converters according to an embodiment of the present disclosure.

FIG. 6 is a schematic circuit diagram illustrating an integrated circuitry structure of plural power converters according to an embodiment of the present disclosure. The present disclosure further provides an integrated circuitry structure of X power converters, wherein X is an integer greater than or equal to 2. For example, X is 2, and each power converter has the circuitry structure of the power converter 1 as shown in FIG. 1. That is, as shown in FIG. 6, the integrated circuitry structure includes two single-phase power converters 1*a* and 1*b*. In case that the integrated circuitry structure includes X power converters 1, the input terminals of the X power converters 1 are electrically connected with each other in parallel, and the output terminals of the X power converters 1 are electrically connected with each other in parallel. The phase difference between the associated signals of every two adjacent power converters 1 is (180/X±θ) degree. Moreover, the phase difference between every two adjacent ones of the N first PWM control signals PWM1 is equal to (360/X±θ) degree.

From the above descriptions, the present disclosure provides the power converter. Each power conversion unit of the power converter includes the signal processor. The signal processor generates a plurality of PWM driving signals according to the PWM control signal from the controller. Consequently, the main switching circuit and the synchronous rectifier circuit are driven by the plurality of PWM driving signals. Due to the arrangement of the signal processor, the number of the PWM control signals to be outputted from the controller is reduced. In this way, the number of the signal lines on the system board of the power converter is reduced, and the wiring area on the system board is reduced. Moreover, the resources of the controller for outputting PWM control signals are also reduced. Even if the power converter is the multi-phase circuit, it is not necessary to increase the size of the controller and the method of designing the controller is simplified.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A power converter comprising:
    N power conversion units, wherein N is an integer greater than or equal to 1, and each power conversion unit comprises:
        a main switching circuit comprising a bridge circuit;
        a transformer, wherein a primary winding of the transformer is electrically connected with the main switching circuit;
        a synchronous rectifier circuit electrically connected with a secondary winding of the transformer, wherein the synchronous rectifier circuit comprises at least two synchronous rectifier switches;
        an input signal terminal receiving a first pulse width modulation (PWM) control signal; and
        a signal processor, wherein the signal processor generates a first PWM driving signal and a second PWM driving signal to drive the bridge circuit according to the first PWM control signal, and a phase difference between the first PWM driving signal and the second PWM driving signal is (180±θ) degree, wherein the signal processor generates a third PWM driving signal and a fourth PWM driving signal to drive the at least two synchronous rectifier switches according to the first PWM control signal, and a phase difference between the third PWM driving signal and the fourth PWM driving signal is (180±θ) degree,
    wherein when N is greater than 1, the N power conversion units are connected with each other in parallel, and a difference between every two adjacent ones of the N first PWM control signals is (360/N±θ) degree, wherein θ is greater than or equal to 0 degree and less than 30 degree.

2. The power converter according to claim 1, wherein the signal processor further comprises a phase splitter for performing a phase-splitting operation on the first PWM control signal to generate a second PWM control signal and a third PWM control signal with a predetermined phase difference therebetween.

3. The power converter according to claim 2, wherein the signal processor comprises a logic delay circuit, and the logic delay circuit delays the second PWM control signal for different time intervals respectively, so that a fourth PWM control signal and a fifth PWM control signal with a dead time therebetween are generated, wherein the logic delay circuit delays the third PWM control signal for different time intervals, so that a sixth PWM control signal and a seventh PWM control signal with a dead time therebetween are generated.

4. The power converter according to claim 3, wherein the signal processor further comprises two first drivers, and the two first drivers are electrically connected with the logic delay circuit to receive the fourth PWM control signal and the sixth PWM control signal, respectively, wherein one of the two first drivers increases power and driving capacity of the fourth PWM control signal, so that the first PWM driving signal is generated, wherein the other of the two first drivers increases power and driving capacity of the sixth PWM control signal, so that the second PWM driving signal is generated.

5. The power converter according to claim 3, wherein the signal processor further comprises two second drivers, and the two second drivers are electrically connected with the logic delay circuit to receive the fifth PWM control signal and the seventh PWM control signal respectively, wherein one of the two second drivers increases power and driving capacity of the fifth PWM control signal and performs an inverting operation on the fifth PWM control signal, so that the third PWM driving signal is generated, wherein the other of the two second drivers increases power and driving capacity of the seventh PWM control signal and performs the inverting operation on the seventh PWM control signal, so that the fourth PWM driving signal is generated.

6. The power converter according to claim 1, wherein each power conversion unit further comprises a current detection element, and the current detection element is electrically connected with the bridge circuit, wherein the current detection element is used to detect a current flowing through the bridge circuit and generate a current detection signal corresponding to a current amplitude of the power conversion unit.

7. The power converter according to claim 1, wherein the first PWM driving signal and the third PWM driving signal are complementary to each other, and the second PWM driving signal and the fourth PWM driving signal are complementary to each other.

8. The power converter according to claim 1, wherein when the first PWM driving signal is not transmitted into the input signal terminal, voltages provided by the first PWM driving signal, the second PWM driving signal, the third PWM driving signal and the fourth PWM driving signal are off-state voltages.

9. The power converter according to claim 1, wherein the bridge circuit is a half-bridge circuit or a full-bridge circuit, and the synchronous rectifier circuit is a current doubler circuit or a center-tap circuit.

10. The power converter according to claim 2, wherein the predetermined phase difference is (180±θ) degrees.

11. The power converter according to claim 1, wherein the main switching circuit and the synchronous rectifier circuit are electrically connected.

* * * * *